(12) United States Patent
Metzger et al.

(10) Patent No.: US 7,858,948 B2
(45) Date of Patent: Dec. 28, 2010

(54) RADIATION DETECTOR FOR X- OR GAMMA RAYS

(75) Inventors: Wilhelm Metzger, Munich (DE); Khanh Pham Gia, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/798,844

(22) Filed: May 17, 2007

(65) Prior Publication Data

US 2007/0269009 A1 Nov. 22, 2007

(30) Foreign Application Priority Data

May 18, 2006 (DE) ...................... 10 2006 023 454

(51) Int. Cl.
*G01T 1/20* (2006.01)

(52) U.S. Cl. .............................. 250/370.11; 250/487.1; 264/1.9; 438/72

(58) Field of Classification Search ............ 250/370.11, 250/367, 366, 483.1, 487.1; 438/69, 72; 378/19; 264/1.1, 1.9; 106/448, 446
See application file for complete search history.

(56) References Cited

U.S. PATENT DOCUMENTS

| 4,816,182 | A  | * | 3/1989  | Novich et al. ................. 516/90 |
| 6,075,250 | A  |   | 6/2000  | Fukui et al. |
| 7,138,010 | B1 | * | 11/2006 | El-Shoubary et al. ....... 106/448 |
| 7,329,875 | B2 | * | 2/2008  | McEvoy et al. ............. 250/367 |
| 2003/0108667 | A1 | * | 6/2003 | McIntyre et al. ............ 427/212 |
| 2003/0178570 | A1 |   | 9/2003 | Tsunota et al. |

FOREIGN PATENT DOCUMENTS

| EP | 1 348 982    | 3/2003 |
| EP | 1 348 982 A2 | 3/2003 |

* cited by examiner

*Primary Examiner*—David P Porta
*Assistant Examiner*—Yara B Green
(74) *Attorney, Agent, or Firm*—Harness, Dickey & Pierce, P.L.C.

(57) ABSTRACT

A radiation detector is disclosed for X- or gamma rays. In at least one embodiment, the radiation detector includes an array of scintillation detectors and a reflector layer separating these from one another. The reflector layer includes a binder matrix and particles of a light-reflecting material embedded therein, the surfaces of the particles being coated at least partially with a dispersant.

15 Claims, No Drawings

RADIATION DETECTOR FOR X- OR GAMMA RAYS

PRIORITY STATEMENT

The present application hereby claims priority under 35 U.S.C. §119 on German patent application number DE 10 2006 023 454.5 filed May 18, 2006, the entire contents of which is hereby incorporated herein by reference.

FIELD

Embodiments of the invention generally relate to a radiation detector for X- or gamma rays. In at least one embodiment, such a detector, which is used for example in computer tomography, includes a detector array having a multiplicity of scintillators. A scintillator in turn includes a scintillating material, which absorbs the gamma or X-radiation and converts it into visible light. Examples of suitable scintillator materials are materials such as $Gd_2O_2S$:Pr or CsI:Tl doped with activators such as Pr or Tl. The light emitted by the scintillators is registered by photodetectors, and the corresponding electrical signals are post-processed, for example for image reconstruction in computer tomography. The pixel sizes of a detector array, and therefore the sizes of the scintillators, lie the range of 1 mm×1 mm.

BACKGROUND

In modern computer tomographs, the scintillators are arranged in the form of two-dimensional arrays, the flat plane of which lies perpendicular to the incident radiation. In order to ensure a high image resolution, it is necessary to prevent lateral propagation of the light signals of the individual scintillators.

They are therefore separated from one another with the aid of a reflector layer. This layer should have a high reflectivity and a low absorptivity and transmissivity for the scintillation light, in order to ensure a high luminous efficiency and low crosstalk of the light signals with neighboring scintillators. A reflector layer conventionally consists of a binder matrix to which a material in powder form with a high refractive index is added, for example $TiO_2$, ZnO, MgO or $BaSO_4$ particles. The particle sizes of the particles are less than 5 μm.

For the production of a detector array, gaps with a width of between 50 μm and 400 μm are left free between the individual scintillators, and these are filled with the reflector casting compound described above. So that the casting compound can readily flow into the gaps, its viscosity must not be too high. Since the powder materials increase the viscosity of a casting compound, their proportion cannot be increased to the extent necessary in order to achieve optimal optical properties. In the case of two-component epoxy resins, casting with a proportion of about 25 vol. % $TiO_2$ powder particles is just still possible.

SUMMARY

In at least one embodiment of the invention, a radiation detector is provided for X- and gamma rays having a reflector layer, whose reflectivity is increased relative to conventional radiation detectors.

The radiation detector for X- or gamma rays, in at least one embodiment, includes an array of scintillation detectors and a reflector layer separating these from one another, which comprises a binder matrix and particles of a light-reflecting material embedded therein, wherein the surfaces of the particles are coated at least partially with a dispersant. This modifies the surface charge of the particles (electrostatic dispersion) or maintains a minimum distance between neighboring particles (steric dispersion). Both effects lead to effective separation of the particles and therefore to a reduction in the viscosity of the casting compound.

A higher proportion of particles can therefore be added to a given casting compound, without the mixture thereby exceeding a critical viscosity threshold. Powder particles can be added in a proportion of more than 40 vol. % to said epoxy resins while maintaining a viscosity of about 7000 mPa·s suitable for the process (plate-ball method, at room temperature).

A dispersant suitable for the present purpose must not affect the reflectivity of the light-refracting particles, or must affect it only slightly. One dispersant which ensures this and furthermore allows a high fill factor of the reflector layer with particles is an alkylammonium salt of a copolymer, having acidic groups. In the case of a casting compound based on epoxy resin, a fill factor of up to 50 vol. % can be achieved for example with $TiO_2$ which is coated with such a dispersant. In order to ensure a maximally high reflectivity of the reflector layer, it is expedient for the light-refracting particles to have a particle size of less than 5 μm.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

The invention will be explained in more detail below with the aid of an example embodiment. A mixture of 45 vol. % i.e. 69.2 wt. % $TiO_2$ powder with a particle size of less than 5 μm and 55 vol. % i.e. 30.8 wt. % of an epoxy resin consisting of two components (Araldite 2020 from Ciba Geigy) is prepared as the casting compound. The titanium oxide powder is coated before addition to the epoxy resin with 4 wt. % of a steric dispersant, namely an alkylammonium salt of a copolymer having acidic groups. Such dispersants are available for example under the brand name Disperbyk 180 from Byk-Chemie, D-46462 Wesel, DE.

The dispersant is dissolved in distilled water and the titanium oxide powder is subsequently added stepwise with constant stirring. The resulting mixture is dried until complete removal of water at about 60-80° C. in a drying oven. As an alternative, freeze drying may also be carried out. The freeze-dried mixture is subsequently ground finely and screened, in order to separate off coarse aggregates.

The finely ground titanium oxide powder coated with dispersant was added in the aforementioned proportion to the two-component epoxy resin with the aid of a mixer (speed mixer from Hauschild) at a high mixing speed (1000-3000 rpm). The finished compound had a viscosity of about 7000 mPa·s (plate-ball method, room temperature) and could therefore be readily poured into the gaps, which have a width for example 80 μm, between the individual scintillators of a detector array. Despite the high fill factor of 45 vol. % titanium oxide particles, the casting compound, i.e. the fluid two-component epoxy resin, had a lower viscosity than in the case of a comparable casting compound which contains only 25 vol. % of uncoated titanium oxide particles. The viscosity-reducing effect of the coated particles is very pronounced particularly in the low shear stress range, it being precisely this range which is crucial for pouring the casting compound into the gaps in question.

In order to study the optical properties, reflector films were made from the aforementioned casting compound. In this case, 5 mm thick blocks with a length of 40 and a width of 30 mm were cast and subsequently cured. Reflector films with thicknesses of from 50 μm to 400 μm were produced from the plates by grinding the blocks. The optical properties of the reflector films, namely reflection and transmission, were measured by means of a spectrometer (Perkin Elmer Lambda 900).

The results showed that with a stronger fill factor, the reflectivity of the films is increased and the transmission significantly reduced. This effect is particularly pronounced in the case of films with a small thickness. The luminous efficiency of a model scintillator was also calculated with the aid of a Monte-Carlo program available on the market. In this case, 80 μm thick reflector layers with titanium oxide fill factors of 25 vol. %, 45 vol. % and 65 vol. % were assumed. With a fill factor of 45 vol. %, this gave an increase of 7% in the luminous efficiency, and 12% with a fill factor of 65 vol. %, compared with the hitherto conventional particle fill factors of 25 vol. %.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A radiation detector for at least one of X-rays and gamma rays, comprising:
   an array of scintillation detectors; and
   a reflector layer separating the array of scintillation detectors from one another, the reflector layer comprising a binder matrix and particles of a light-reflecting material embedded therein, wherein the surfaces of the particles are coated at least partially with a dispersant to increase a fill factor of the reflector layer and thereby increase reflectivity of the reflector layer.

2. The detector array as claimed in claim 1, wherein the dispersant is a steric dispersant.

3. The radiation detector as claimed in claim 2, wherein the steric dispersant is an alkylammonium salt of a copolymer, having acidic groups.

4. The detector array as claimed in claim 1, wherein the reflector layer contains $TiO_2$ particles.

5. The detector array as claimed in claim 1, wherein the particles have a particle size of less than 5 μm.

6. The detector array as claimed in claim 1, wherein the binder is an epoxy resin.

7. The detector array as claimed in claim 2, wherein the reflector layer contains $TiO_2$ particles.

8. The detector array as claimed in claim 3, wherein the reflector layer contains $TiO_2$ particles.

9. The detector array as claimed in claim 2, wherein the particles have a particle size of less than 5 μm.

10. The detector array as claimed in claim 2, wherein the binder is an epoxy resin.

11. The detector array as claimed in claim 3, wherein the particles have a particle size of less than 5 μm.

12. The detector array as claimed in claim 3, wherein the binder is an epoxy resin.

13. The detector array as claimed in claim 4, wherein the particles have a particle size of less than 5 μm.

14. The detector array as claimed in claim 4, wherein the binder is an epoxy resin.

15. The detector array as claimed in claim 5, wherein the binder is an epoxy resin.

* * * * *